(12) United States Patent
Aoyama

(10) Patent No.: US 8,129,077 B2
(45) Date of Patent: Mar. 6, 2012

(54) METHOD OF MANUFACTURING FUEL CELL

(75) Inventor: Satoshi Aoyama, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 806 days.

(21) Appl. No.: 12/096,981

(22) PCT Filed: Dec. 6, 2006

(86) PCT No.: PCT/JP2006/324783
§ 371 (c)(1),
(2), (4) Date: Jun. 11, 2008

(87) PCT Pub. No.: WO2007/069617
PCT Pub. Date: Jun. 21, 2007

(65) Prior Publication Data
US 2009/0200172 A1     Aug. 13, 2009

(30) Foreign Application Priority Data

Dec. 14, 2005 (JP) ................................. 2005-359741

(51) Int. Cl.
*H01M 8/00* (2006.01)
*C25D 5/00* (2006.01)
*C25D 5/34* (2006.01)

(52) U.S. Cl. ............................ 429/535; 205/88; 205/209

(58) Field of Classification Search .......... 429/400–535; 205/88, 209
See application file for complete search history.

(56) References Cited

U.S. PATENT DOCUMENTS

2002/0015793 A1    2/2002 Lee et al.
2002/0031695 A1    3/2002 Smotkin
2004/0043277 A1    3/2004 Ito et al.
2007/0163437 A1*   7/2007 Ikeda et al. ......................... 96/4
2007/0270301 A1*  11/2007 Song et al. ...................... 501/80

FOREIGN PATENT DOCUMENTS

| GB | 1084238 | 9/1967 |
| JP | 1-119662 | 5/1989 |
| JP | 2002-115056 | 4/2002 |
| JP | 2004-146337 | 5/2004 |
| JP | 2005-19041 | 1/2005 |
| JP | 2005-339815 | 12/2005 |
| WO | WO 2005/104276 A1 | 11/2005 |

OTHER PUBLICATIONS

S. Yamaguchi et al., "Construction of Fuel Cells Based on Thin Proton Conducting Oxide Electrolyte and Hydrogen-Permeable Metal Membrane Electrode," Solid State Ionics, vol. 162-163, pp. 291-296 (2003).

Hou, K. et al., "The effect of external mass transfer, competitive adsorption and coking on hydrogen permeation through thin Pd/Ag membranes," Journal of Membrane Science, vol. 206, (2002), pp. 119-130.

Office Action from the German Patent and Trademark Office for German Appl. No. 11 2006 003 170.8-45 dated Sep. 9, 2011.

* cited by examiner

*Primary Examiner* — Patrick Ryan
*Assistant Examiner* — Muhammad Siddiquee
(74) *Attorney, Agent, or Firm* — Finnegan, Henderson, Farabow, Garrett & Dunner, LLP

(57) ABSTRACT

A method of manufacturing a fuel cell includes thermally treating a hydrogen permeable membrane in a given temperature higher than an actual operating temperature of the fuel cell, and forming an electrolyte layer on the hydrogen permeable membrane subjected to the thermal treatment. The hydrogen permeable membrane is composed of a polycrystalline metal.

5 Claims, 4 Drawing Sheets

COMPARATIVE SAMPLE

SAMPLE 1-1

SAMPLE 1-2

COMPARATIVE SAMPLE

SAMPLE 2-1

SAMPLE 2-2

SAMPLE 2-3

U.S. 8,129,077 B2

METHOD OF MANUFACTURING FUEL CELL

CROSS-REFERENCE TO RELATED APPLICATIONS

This application is a national phase application of International Application No. PCT/JP2006/324783, filed Dec. 6, 2006, and claims the priority of Japanese Application No. 2005-359741, filed Dec. 14, 2005, the content of both of which is incorporated herein by reference.

TECHNICAL FIELD

This invention generally relates to a method of manufacturing a fuel cell.

BACKGROUND ART

One or more aspects of this invention generally relate to a method of manufacturing a fuel cell.

In general, a fuel cell is a device that obtains electrical power from fuel, hydrogen and oxygen. Fuel cells are being widely developed as an energy supply system because fuel cells are environmentally superior and can achieve high energy efficiency.

There are some types of fuel cells including a solid electrolyte such as a polymer electrolyte fuel cell, a solid-oxide fuel cell, and a hydrogen permeable membrane fuel cell (HMFC). Here, the hydrogen permeable membrane fuel cell has a dense hydrogen permeable membrane. The dense hydrogen permeable membrane is composed of a metal having hydrogen permeability, and acts as an anode. The hydrogen permeable membrane fuel cell has a structure in which a solid electrolyte having proton conductivity is deposited on the hydrogen permeable membrane. Some hydrogen provided to the hydrogen permeable membrane is converted into protons. The protons are conducted in the electrolyte having proton conductivity and react with oxygen provided to a cathode. Electrical power is thus generated.

Japanese Patent Application Publication No. 2004-146337, for example, proposes a method of forming a proton-conductive-electrolyte layer on a substrate of dense metal having hydrogen permeability. According to the method, it is possible to reduce the thickness of the electrolyte layer.

However, it is possible that a boundary separation between the electrolyte layer and the substrate occurs because of an uneven surface of the substrate.

Various aspects of this invention have been made in view of the above-mentioned circumstances. One or more aspects of the invention provide a method of manufacturing a fuel cell in which a boundary separation between a solid electrolyte layer having proton conductivity and a metal substrate having hydrogen permeability is limited.

DISCLOSURE OF THE INVENTION

In exemplary embodiments, a method of manufacturing a fuel cell includes thermally treating a hydrogen permeable membrane in a given temperature higher than an actual operating temperature of the fuel cell, and forming an electrolyte layer on the hydrogen permeable membrane subjected to the thermal treatment. The hydrogen permeable membrane is composed of a polycrystalline metal. In the method, the hydrogen permeable membrane of the crystalline metal is subjected to the thermal treatment in the given temperature higher than the actual operating temperature. After that, the electrolyte layer is formed on the hydrogen permeable membrane. In this case, the metal included in the hydrogen permeable membrane diffuses sufficiently. And a crystal grain is deformed sufficiently. It is therefore possible to restrain the deformation of the hydrogen permeable membrane after the thermal treatment. Accordingly, it is possible to restrain the boundary separation between the hydrogen permeable membrane and the electrolyte layer caused by the deformation of the hydrogen permeable membrane.

In the exemplary embodiment, the hydrogen permeable membrane may be subjected to the thermal treatment for a given time. And the given time may be a time so that a diffusion length calculated with the given time, the given temperature and a diffusion coefficient of the hydrogen permeable membrane is more than a diffusion length calculated with the diffusion coefficient, the actual operating temperature and an actual operating time of the fuel cell. In this case, the metal diffuses sufficiently so that each of the crystal grains is no more sintered or recrystallized. It is therefore possible to restrain the deformation of the hydrogen permeable membrane after the thermal treatment.

An atmosphere may be a vacuum in the step of thermally treating the hydrogen permeable membrane. In this case, it is possible to facilitate the metal diffusion in the hydrogen permeable membrane. And an atmosphere may be a hydrogen atmosphere in the step of thermally treating the hydrogen permeable membrane. In this case, it is possible to facilitate the metal diffusion in the hydrogen permeable membrane.

In the exemplary embodiment, the hydrogen permeable membrane may be subjected to the thermal treatment in a temperature higher than the actual operating temperature of the fuel cell by more than 200 degrees centigrade.

EFFECT OF THE INVENTION

In accordance with the invention, a boundary separation between a hydrogen permeable membrane and an electrolyte layer caused by a deformation of the hydrogen permeable membrane is restrained.

BRIEF DESCRIPTION OF THE DRAWINGS

Exemplary embodiments of one or more aspects of the invention will be described with reference to the following drawings, wherein.

BEST MODE FOR CARRYING OUT THE INVENTION

Figure 1A:
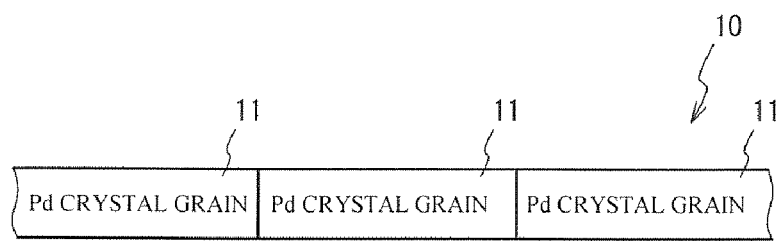
FIG. 1A through FIG. 1E illustrate a schematic view of a method of manufacturing a fuel cell in accordance with an embodiment.

FIG. 1A through FIG. 1E illustrate a schematic view of a method of manufacturing a fuel cell 100 in accordance with an embodiment. As shown in FIG. 1A, a hydrogen permeable membrane 10 having a thickness of approximately 20 μm is provided. The hydrogen permeable membrane 10 in accordance with the embodiment is composed of a polycrystalline metal that is formed by rolling and has hydrogen permeability. Palladium, vanadium, tantalum, zirconium, niobium, an alloy thereof or the like may be used as the polycrystalline metal having hydrogen permeability. In the embodiment, the hydrogen permeable membrane 10 is a thin layer composed of a plurality of palladium crystal grain. The grain is referred to a crystal grain 11. An average diameter of the crystal grains 11 is approximately a few μm to a few tens of μm.

Figure 1B:
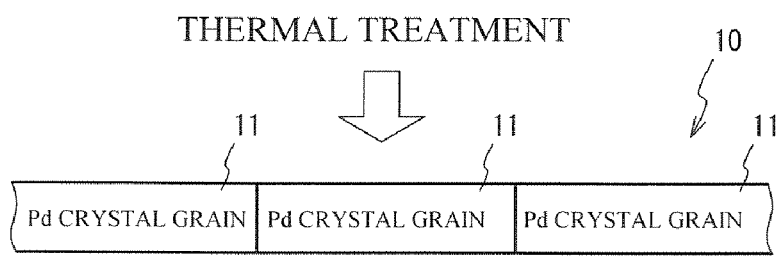
Figure 1C:
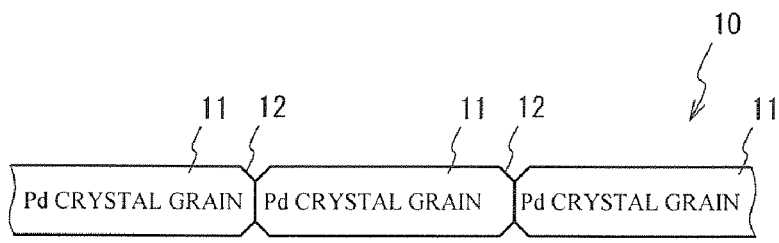

Next, as shown in FIG. 1B, the hydrogen permeable membrane 10 is subjected to a thermal treatment. In this case, each of the crystal grains 11 is deformed so that grain boundary free energy and surface free energy are reduced, because a metal included in the crystal grain 11 diffuses. Thus, as shown in FIG. 1C, the surface of the crystal grain 11 is smoothed. And a grain boundary groove 12 is formed between each of the crystal grains 11. It is preferable that the hydrogen permeable membrane 10 is subjected to the thermal treatment until each of the crystal grains 11 is no more sintered or recrystallized, because it is restrained that the crystal grain 11 is deformed by another thermal treatment after that.

Figure 1D:
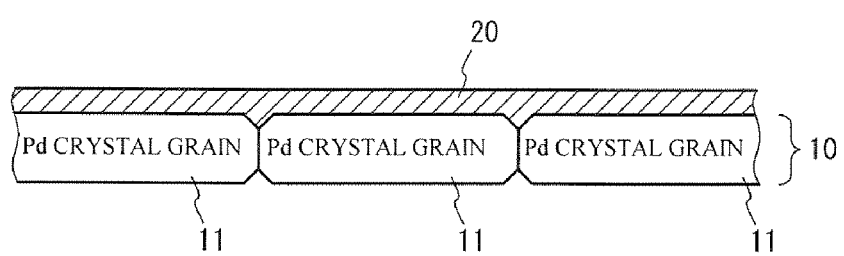
Figure 1E:
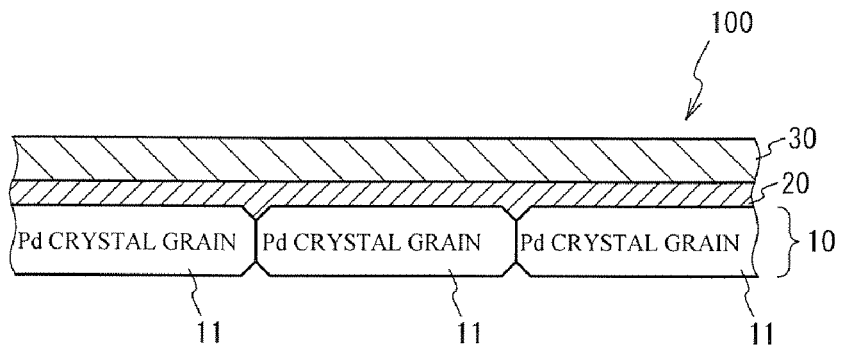

Next, as shown in FIG. 1D, an electrolyte layer 20 having proton conductivity is formed on the hydrogen permeable membrane 10. In this case, the electrolyte layer 20 fills the grain boundary groove 12 and covers the hydrogen permeable membrane 10. The electrolyte layer 20 may be composed of a proton-conductivity-material such as a perovskite proton-conductivity-material ($BaCeO_3$ or the like) or a solid acid proton-conductivity-material ($CsHSO_4$ or the like). The thickness of the electrolyte layer 20 may be approximately 1 μm. Next, as shown in FIG. 1E, a cathode 30 is formed on the electrolyte layer 20. The fuel cell 100 is fabricated through the operations mentioned-above.

In the method of manufacturing the fuel cell in accordance with the embodiment, the hydrogen permeable membrane 10 is subjected to the thermal treatment in advance, and each of the crystal grains 11 is deformed sufficiently. It is therefore possible to restrain the boundary separation between the hydrogen permeable membrane 10 and the electrolyte layer 20 caused by the deformation of the crystal grain 11, even if the hydrogen permeable membrane 10 is heated by the power generation reaction or even if the hydrogen permeable membrane 10 is heated when the electrolyte layer 20 is formed. A description will be given of details of thermal treatment temperature, thermal treatment time, and thermal treatment atmosphere.

In general, an average diffusion length $X_m$ of a metal atom included in a solid metal is shown as following Expression 1.

$$X_m = 2(D \cdot t/\pi)^{0.5} \quad \text{(Expression 1)}$$

"t" in Expression 1 is time. "D" in Expression 1 is a diffusion coefficient and is shown as following Expression 2.

$$D = D_0 \cdot \exp(-Q/RT) \quad \text{(Expression 2)}$$

"R" in Expression 2 is a gas constant. "T" in Expression 2 is an absolute temperature. In a case where palladium is used, "Q" is 266 kJ and "$D_0$" is 0.0000205 $m^2$/s. As shown in Expressions 1 and 2, the average diffusion length $X_m$ is increased when the temperature T gets higher.

It is possible to calculate an average diffusion length $X_{Pd}$ of palladium included in the hydrogen permeable membrane 10 during the operation of the fuel cell 100, if an actual operating time of the fuel cell 100 is assigned to "t" in Expression 1 and an actual operating temperature of the fuel cell 100 is assigned to "T" in Expression 2. Here, the actual operating temperature is the operating temperature of the fuel cell 100 and is, for example, approximately 200 degrees centigrade to 600 degrees centigrade. The actual operating time is an operating time of the fuel cell 100 supposed in advance and is, for example, approximately 5,000 hours to 100.000 hours. The palladium in the hydrogen permeable membrane 10 diffuses sufficiently so that each of the crystal grains 11 is no more sintered or recrystallized, if the fuel cell 100 is operated for the actual operating time.

On the other hand, it is possible to diffuse the palladium in the hydrogen permeable membrane 10, if the hydrogen permeable membrane 10 is subjected to the thermal treatment. In this case, it is possible to reduce the time of the thermal treatment to a large degree, if the thermal treatment temperature is set to be higher than the actual operating temperature. Examples are shown in Table 1. As shown in Table 1, it is possible to reduce the thermal treatment time to approximately 1 or 2 hours, if the thermal treatment temperature is increased to a temperature higher than the actual operating temperature by approximately 200 degrees centigrade. It is therefore possible to diffuse the palladium in the hydrogen permeable membrane 10 advantageously.

TABLE 1

| (Actual operating temperature) × (Actual operating time) | (Thermal treatment temperature) × (Thermal treatment time) |
|---|---|
| (400 degrees C.) × (50,000 hours) | (600 degrees C.) × (1 hour) |
| (450 degrees C.) × (50,000 hours) | (700 degrees C.) × (0.6 hours) |
| (500 degrees C.) × (50,000 hours) | (750 degrees C.) × (2 hours) |

It is thus possible to restrain the deformation of the crystal grain 11 if the hydrogen permeable membrane 10 is subjected to the thermal treatment sufficiently in advance. It is therefore preferable that the thermal treatment time and the thermal treatment temperature are set so that the diffusion length of the palladium in the hydrogen permeable membrane 10 is more than a diffusion length in a case where the fuel cell 100 is operated at the actual operating temperature for the actual operating time. It is more preferable that the thermal treatment temperature is higher than the actual operating temperature from a viewpoint of reduction of cost, because the thermal treatment time is reduced to a large degree.

An atmosphere in the case of the thermal treatment is not limited. It is preferable that the atmosphere is vacuum of few tens of Pa or an inert gas atmosphere such as noble gas or nitrogen. The atmosphere is preferably hydrogen, because metal diffusion is facilitated by hydrogen diffusion. It is therefore possible to reduce the thermal treatment time. Accordingly, it is possible to reduce the production cost of the fuel cell 100.

In a case where other hydrogen permeable polycrystalline metal except for palladium is used as the hydrogen permeable membrane 10, it is possible to obtain the advantage of the present invention if the thermal treatment temperature is set to be higher than the actual operating temperature and lower than a melting temperature of the hydrogen permeable membrane 10. Other hydrogen permeable membrane formed through any other process can be applied to this invention, although the hydrogen permeable membrane formed by rolling is used in the embodiment.

First Example

In a first example, hydrogen permeable membranes (samples 1-1 and 1-2) were subjected to a thermal treatment through the method in accordance with the embodiment mentioned above. And the effect was measured. Conditions of the thermal treatment are shown in Table 2. The sample 1-1 was subjected to the thermal treatment in a vacuum atmosphere of approximately few tens of Pa. The sample 1-2 was subjected to thermal treatment in a 100% hydrogen atmosphere. The thermal treatment temperature was set to be 800 degrees centigrade and the thermal treatment time was set to be 5 hours in the case of both of the samples. In the example, a thin layer composed of palladium was used as the hydrogen permeable membrane.

TABLE 2

|  | Thermal treatment temperature | Thermal treatment time | Atmosphere |
| --- | --- | --- | --- |
| Sample 1-1 | 800 degrees C. | 5 hours | Vacuum (few tens of Pa) |
| Sample 1-2 | 800 degrees C. | 5 hours | Hydrogen 100% |

(Analysis)

Figure 2A:
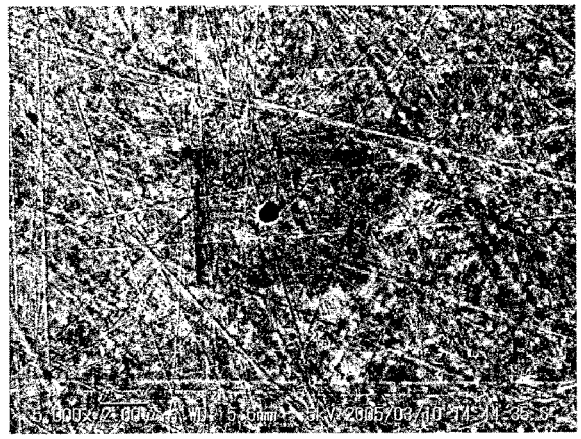
FIG. 2A through FIG. 2C illustrate aspects of a surface of samples 1-1 and 1-2 after a thermal treatment.
Figure 2B:
Figure 2C:
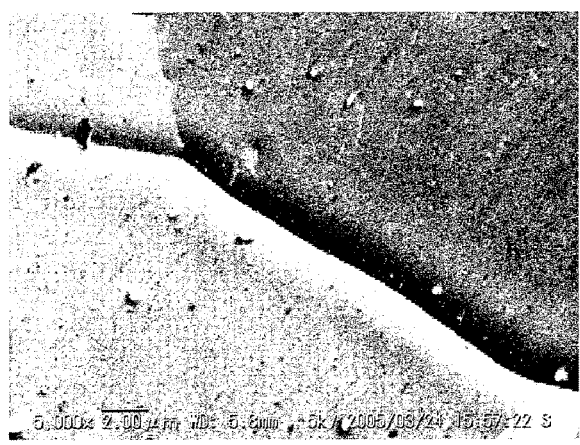

Aspects of the surface of the samples 1-1 and 1-2 after the thermal treatment are shown in FIG. 2B and FIG. 2C. The hydrogen permeable membrane before the thermal treatment is referred to a comparative sample. An aspect of the comparative sample is shown in FIG. 2A. As shown in FIG. 2A, a polishing scratch was formed on the surface of the hydrogen permeable membrane before the thermal treatment. And little grain boundary groove was formed. However, as shown in FIG. 2B and FIG. 2C, the grain boundary groove was formed on the hydrogen permeable membrane after the thermal treatment. Therefore, the metal diffusion in the hydrogen permeable membrane was facilitated through the thermal treatment. And the surface of the hydrogen permeable membrane was smoothed compared to the hydrogen permeable membrane before the thermal treatment. In particular, the sample 1-2 was smoothed to a large degree. It is therefore preferable that the hydrogen permeable membrane is subjected to the thermal treatment in the 100% hydrogen atmosphere in order to facilitate the metal diffusion.

Second Example

In a second example, hydrogen permeable membranes (samples 2-1 through 2-3) were subjected to a thermal treatment through the method in accordance with the embodiment mentioned above. And the effect was measured. Conditions of the thermal treatment were shown in Table 3. As shown in Table 3, the thermal treatment temperature differs with respect to the samples in the example. The thermal treatment temperature was set to be 600 degrees centigrade with respect to the sample 2-1. The thermal treatment temperature was set to be 700 degrees centigrade with respect to the sample 2-2. The thermal treatment temperature was set to be 800 degrees centigrade with respect to the sample 2-3. The thermal treatment time was set to be 5 hours in any cases of the samples. In the example, a thin layer composed of palladium was used as the hydrogen permeable membrane.

TABLE 3

|  | Thermal treatment temperature | Thermal treatment time | Atmosphere |
| --- | --- | --- | --- |
| Sample 2-1 | 600 degrees C. | 5 hours | Hydrogen 100% |
| Sample 2-2 | 700 degrees C. | 5 hours | Hydrogen 100% |
| Sample 2-3 | 800 degrees C. | 5 hours | Hydrogen 100% |

(Analysis)

Figure 3A:
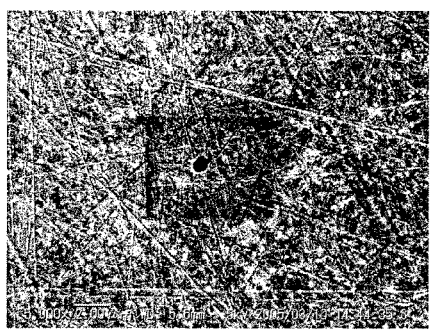
FIG. 3A through FIG. 3D illustrate aspects of a surface of samples 2-1 through 2-3 after a thermal treatment.
Figure 3B:
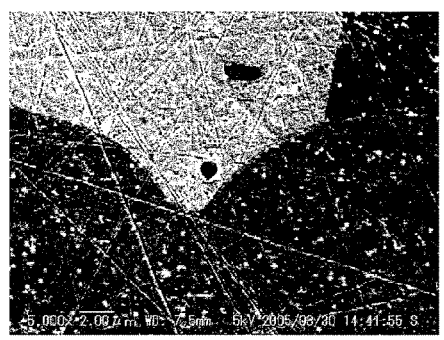
Figure 3C:
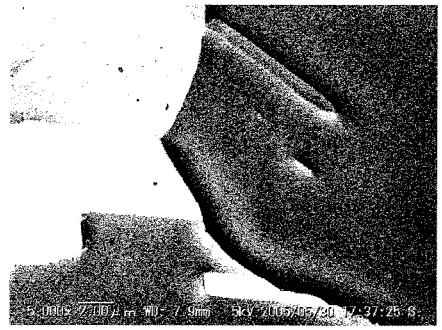
Figure 3D:

Aspects of the surface of the samples 2-1 through 2-3 after the thermal treatment are shown in FIG. 3B through FIG. 3D. The hydrogen permeable membrane before the thermal treatment is referred to a comparative sample. An aspect of the comparative sample is shown in FIG. 3A. As shown in FIG. 3B through FIG. 3D, the surface of each sample was smoothed and the grain boundary groove was formed after the thermal treatment. The surface was more smoothed and the grain boundary groove was formed more notably when the thermal treatment temperature got higher. Therefore, the metal diffusion in the hydrogen permeable membrane was facilitated by increasing the thermal treatment temperature. It is therefore preferable that the thermal treatment temperature is set to be higher in order to facilitate the metal diffusion.

Figure 4A:
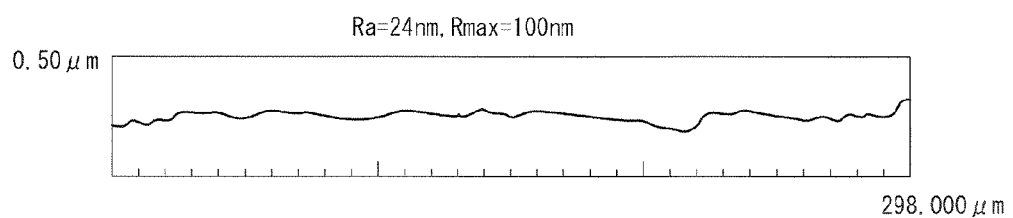
FIG. 4A through FIG. 4C illustrate a surface profile of each sample after a thermal treatment.
Figure 4B:
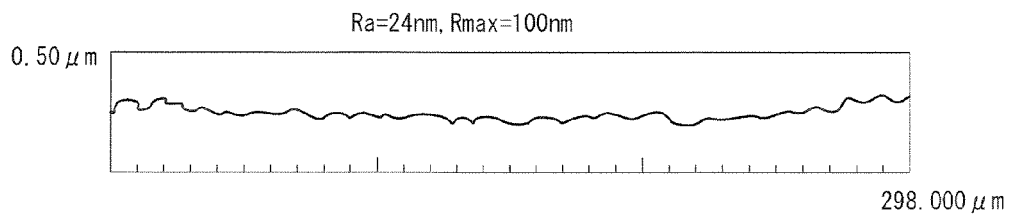
Figure 4C:
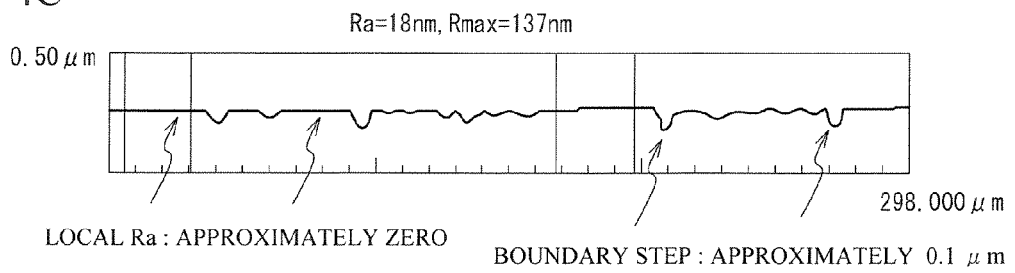

FIG. 4A through FIG. 4C illustrate a surface profile of each sample after the thermal treatment. The vertical axis of each graph indicates a height of the surface of the samples from a given reference depth. The horizontal axis of each graph indicates a position in a width direction of the measured range. As shown in FIG. 4A, little grain boundary groove was formed on the comparative sample. An average roughness Ra of the comparative sample was 24 nm. A maximum valley height Rmax of the comparative sample was 100 nm. Here, the average roughness Ra and the maximum valley height Rmax is a value calculated by a calculation method shown in JIS B0601.

On the other hand, the average roughness Ra and the maximum valley height Rmax of the sample 2-1 were approximately as same as those of the comparative sample. However, a boundary groove was formed on the sample 2-1 as shown in FIG. 4B. A boundary groove was formed notably on the sample 2-3 as shown in FIG. 4C. This is because the maximum valley height Rmax of the sample 2-3 was a large value, 137 nm. A grain boundary step was approximately 0.1 μm tall. And the surface of the sample 2-3 was smoothed. This is because the average roughness Ra of the sample 2-3 was a small value, 18 nm. In particular, on the sample 2-3, the average roughness Ra in an area except for the grain boundary groove was approximately zero. Therefore, it is confirmed that the metal diffusion is facilitated when the thermal treatment temperature is increased, and that accordingly a grain boundary groove is formed notably and a surface is smoothed.

In accordance with the first example and the second example, the metal diffusion is facilitated when the hydrogen permeable membrane is subjected to the thermal treatment. The deformation of the hydrogen permeable membrane is therefore restrained when the hydrogen permeable membrane is subjected to the thermal treatment sufficiently. Accordingly, it is possible to restrain the boundary separation between the hydrogen permeable membrane and the electrolyte layer caused by the deformation of the hydrogen permeable membrane, if the hydrogen permeable membrane is subjected to the thermal treatment sufficiently and the electrolyte layer is formed on the hydrogen permeable membrane. In addition, it is confirmed that the atmosphere in the thermal treatment is a vacuum atmosphere or a 100% hydrogen atmosphere, as a result of the first example. Further, it is confirmed that the thermal treatment temperature is preferably set to be higher, as a result of the second example.

The invention claimed is:

1. A method of manufacturing a fuel cell comprising:
    thermally treating a hydrogen permeable membrane in a hydrogen atmosphere at a given temperature higher than an actual operating temperature of the fuel cell for a given time; and
    forming an electrolyte layer on the hydrogen permeable membrane subjected to the thermal treatment,
    wherein:
    the hydrogen permeable membrane is composed of a polycrystalline metal; and
    the given time is a time so that a diffusion length calculated with the given time, the given temperature and a diffusion coefficient of the hydrogen permeable membrane is more than a diffusion length calculated with the diffusion coefficient, the actual operating temperature and an actual operating time of the fuel cell.

2. A method of manufacturing a fuel cell comprising:

thermally treating, for a given time, a hydrogen permeable membrane in a hydrogen atmosphere, the hydrogen permeable membrane being a polycrystalline metal composed of palladium or palladium alloy; and forming an electrolyte layer on the hydrogen permeable membrane subjected to the thermal treatment;

wherein the given time is a time so that a diffusion length calculated with the given time, a thermal treatment temperature and a diffusion coefficient of palladium in the hydrogen permeable membrane is more than a diffusion length calculated with the diffusion coefficient, an actual operating temperature and an actual operating time of the fuel cell.

3. The method as claimed in claim 2, wherein the hydrogen permeable membrane is subjected to the thermal treatment at a temperature higher than 200 degrees C.

4. The method as claimed in claim 2, wherein the hydrogen permeable membrane is subjected to the thermal treatment at a temperature higher than 600 degrees C.

5. The method as claimed in claim 2, wherein the electrolyte layer is composed of a perovskite electrolyte or a solid acid electrolyte.

* * * * *